United States Patent [19]

Kennedy et al.

[11] 4,271,138

[45] Jun. 2, 1981

[54] PROCESS FOR PRODUCING ALUMINUM OXYCHLORIDE SOLUTIONS FROM LOW MOLECULAR WEIGHT ALUMINUM ALKOXIDES

[75] Inventors: Eugene F. Kennedy; Bruce E. Leach, both of Ponca City, Okla.

[73] Assignee: Conoco, Inc., Ponca City, Okla.

[21] Appl. No.: 142,494

[22] Filed: Apr. 21, 1980

[51] Int. Cl.³ .............................................. C01B 11/00
[52] U.S. Cl. .................................. 423/462; 423/472; 264/DIG. 19
[58] Field of Search ...................... 423/462, 472, 630; 424/68

[56] References Cited

U.S. PATENT DOCUMENTS 3,887,691  6/1975  Kobetz ................................ 423/462

FOREIGN PATENT DOCUMENTS 1326956  4/1963  France .................................... 423/630

OTHER PUBLICATIONS

*Chemical Abstracts,* vol. 82 (1975) No. 61,296r.

*Primary Examiner*—Brian E. Hearn
*Attorney, Agent, or Firm*—Cortlan R. Schupbach, Jr.

[57] ABSTRACT

HCl gas is added to aluminum alkoxides containing from 1 to 5 carbon atoms (0.5 mole HCl/mole Al) and the mixture is hydrolyzed in water. Alcohol is recovered by azeotropic distillation and the product, a solution of aluminum oxychloride, is concentrated.

12 Claims, No Drawings

PROCESS FOR PRODUCING ALUMINUM OXYCHLORIDE SOLUTIONS FROM LOW MOLECULAR WEIGHT ALUMINUM ALKOXIDES

This invention relates to a new and improved method for preparing aluminum oxychlorides. More specifically, this invention relates to a process for producing aluminum oxychlorides by adding hydrochloric acid to aluminum alkoxides where alkoxide units contain from 1 to 5 carbon atoms, hydrolyzing the reaction product and removing alcohols formed in hydrolysis and recovering aluminum oxychloride.

In the prior art it is known to prepare aluminum salt solutions beginning with aluminum metal as described in British Pat. No. 1,360,200 and dissolving the metal in aqueous hydrochloric acid. However, in practice it is found that at a 2 to 1 or a 1½ to 1 aluminum to chlorine ratio, the dissolution of aluminum metal is very slow. The rate of aluminum consumption decreases rapidly as the free hydrochloric acid concentration decreases during the reaction.

U.S. Pat. No. 3,887,691 describes the preparation of aluminum oxychloride from alkoxides having a carbon atom content of 6 to 30 carbon atoms. This reference describes aluminum alkoxides having alkoxy groups where corresponding alcohols are substantially insoluble in water. This method of preparing aluminum oxychlorides uses a two phase system which makes separation and materials processing difficult.

Aluminum oxychlorides, once obtained, are extremely useful for preparing alumina fibers, yarns and monofilaments. Such alumina materials can be prepared by any one of a number of known methods such as described in U.S. Pat. Nos. 3,865,917; 3,887,691; British 1,414,854; U.S. Pat. No. 3,950,478; and British Pat. No. 1,470,292.

However, these methods deal with the end use of the aluminum oxychloride provided by the process of the instant invention and not to the process for obtaining this material itself.

One method for obtaining aluminum chlorohydrates or oxychlorides is the method taught in U.S. Pat. No. 3,887,691 wherein aluminum alkoxides are reacted with hydrochloric acid in an aqueous system in molar proportions of from about 0.5 to about 1 mole of hydrochloric acid per mole of aluminum alkoxide. The product of this reaction separates into two phases; one phase containing organic alcohol co-products, and the other an aqueous phase containing the hydroxy chloroaluminum compound in solution. However, handling problems and separation of the phases are difficult. In addition, alcohols are retained by the aluminum oxychloride solution and extraction of the alcohols is difficult. This difficulty becomes more severe at higher aluminum to chlorine ratios. This is especially true for the most desirable aluminum to chlorine ratios around 2 to 1 respectively. It would therefore be very desirable to provide an improved process for obtaining solutions of aluminum oxychlorides suitable for fiber production.

It is therefore an object of the present invention to prepare aluminum oxychloride solution in a novel manner while providing low entrainment of alcohols and avoiding alumina gels. Other objects will become apparent to those skilled in this art as the description proceeds.

It has now been discovered in accordance with the instant invention that aluminum oxychlorides can be produced in a single phase process comprising
(a) adding hydrochloric acid to aluminum alkoxides where the alkoxide units contain from 1 to 5 carbon atoms to form chloride containing alkoxides, wherein from about 0.2 to about 1.0 moles of hydrochloric acid per mole of aluminum alkoxide is used;
(b) hydrolyzing the reaction product of (a) to form alcohols and aluminum oxychlorides, then
(c) removing alcohols and recovering the aluminum oxychloride.

This process is effective for aluminum alkoxides where the alkoxide units contain from 1 to 5 carbon atoms since resulting alcohols are substantially water soluble and are easily removed by simple distillation techniques, requiring no phase separation. Preferably, aluminum alkoxides will contain from 2 to 4 carbon atoms for maximum effect. These alkoxides can be obtained by any of several methods. One very acceptable method is the simple dissolution of aluminum metal in an alcohol containing from 1 to 5, preferably 2 to 4, carbon atoms and recovering the aluminum alkoxides formed thereby. Normally, 4 and 5 carbon atom alcohols are not completely soluble in aqueous phase, but these alcohols are substantially soluble in aqueous aluminum oxychloride phase. Another method is to use Ziegler aluminum alkyl chemistry to obtain growth products containing low molecular weight alkoxide.

However, from whatever source obtained, the aluminum alkoxides are reacted with hydrochloric acid in either gaseous or aqueous form to produce chloride-containing alkoxides. These reaction products are then hydrolyzed to form water-soluble alcohols of low molecular weight and aluminum oxychloride. The reaction conditions for this reaction are not critical and will normally be carried out at temperatures of from about 20° to about 130° C. for the reaction of hydrochloric acid and temperatures of from about 20° to about 120° C. for the subsequent hydrolysis.

Pressure is in no way critical to the process of the present invention and ambient pressure is preferred. However, the reactions will normally be carried out at temperatures up to about 100 pounds per square inch gauge (psig), although higher or lower pressures can be used.

In carrying out the process of the instant invention the mole ratio of aqueous or gaseous hydrochloric acid to aluminum alkoxide normally ranges from about 0.2 to about 1.0, but from about 0.3 to about 0.8 moles hydrochloric acid per mole of aluminum. However from about 0.4 to about 0.6 moles of hydrochloric acid per mole of aluminum is preferred. Once the hydrolysis is complete, alcohols can be recovered by simple distillation and then recycled to the dissolution of aluminum metal if this method of preparing alkoxides is used. If a mole ratio of less than 0.4 is used, aqueous HCl will normally be used to give a final chlorine/aluminum ratio of 0.4 or greater.

The present invention is characterized by several important aspects. First, any method of preparing the aluminum alkoxides can be used, but an especially rapid process initially utilizing aluminum metal is provided wherein the aluminum metal is reacted with a low molecular weight alcohol. Such a reaction is rapid and is substantially complete. Only traces of very fine aluminum metal remain, which can be removed by filtration.

Such small traces are not detrimental to subsequent hydrolysis, but should be removed prior to fiber formation using the resultant aluminum oxychlorine solution.

Secondly, the subsequent hydrolysis reaction is rapid and complete when performed as described herein. The desired product alcohols are readily recovered by simple distillation and can be recycled to the formation of alkoxide by reaction with aluminum metal. These alcohols are substantially soluble in the aqueous aluminum oxychloride containing phase and provide a single phase system which is much more easily handled than the 2-phase systems of the prior art. The removal of entrained high molecular weight alcohols which is an inherent problem with prior art processes is avoided. One particular benefit of the present method rises from the rapid rate of the reactions as opposed to the known methods, together with the removal of the restraints on subsequent fiber forming which are imposed by the entrained high molecular weight alcohols inherent in prior art methods.

Thus being simply described, the instant invention is more concretely described with reference to the examples below wherein all parts and percentages are by weight unless otherwise specified. The examples are provided solely to illustrate the present invention and not to limit it.

EXAMPLE 1

A comparison of a range of aluminum alkoxides wherein the alkoxide group averaged 10 carbon atoms (total carbon range from 2 to 20 carbon atoms, normal oxidized Ziegler chemistry growth product) was made. These aluminum alkoxides were heated to 80° C. in a stirred flask under a nitrogen atmosphere. Gaseous hydrogen chloride (0.5 moles, 18.25 grams) was added to aluminum alkoxides (1.0 moles, 491 grams). The mixture was hydrolyzed in 250 cubic centimeters (cc) of hot water at a temperature of 95° C. for 1 hour. The solution was milky white and when cooled, gelled due to the presence of alumina. This solution was not suitable for fiber formation.

EXAMPLE 2

Aluminum metal (2 moles, 54 grams) was added slowly to refluxing n-butanol in a three neck two-liter flask equipped with a reflux condenser and thermometer. The reaction is excess butanol was complete within 3 hours. Less time would be required if hydrogen evolution is maintained at a higher rate.

The alkoxide obtained was reacted with gaseous hydrogen chloride (34 grams). After addition the alkoxide was viscous and some precipitation occurred. The mixture obtained was hydrolyzed in water. Aluminum oxychloride entrained large amounts of alcohol and was mostly insoluble. The removal of butanol/water was started. The aluminum salt went into clear solution after a majority of the alcohol was removed. The solution was filtered to remove traces of aluminum metal which was unreacted in the initial reaction then concentrated to the desired viscosity. The solution was entirely suitable for fiber formation. Fibers were drawn from concentrated solutions using a glass rod.

EXAMPLE 3

An experiment was carried out to show the effect of aqueous hydrochloric acid addition to aluminum ethoxides. 54 grams of aluminum metal was added slowly to refluxing ethanol in a three neck two-liter flask equipped with a reflux condenser and thermometer. The alkoxide was hydrolyzed with aqueous hydrochloric acid (92.25 cc of 37.5% hydrochloric acid) to give a clear solution. The aluminum to chlorine ratio was 1.75. The resulting product was suitable for fiber formation using the procedure of Example 2.

EXAMPLE 4

Example 3 was carried out exactly as described except that aluminum isopropoxide was prepared. Aqueous hydrochloric acid was added to give an aluminum to chlorine ratio of 1.75. The resulting product likewise was suitable for drawing fiber using the procedure of Example 2.

EXAMPLE 5

Aluminum butoxide (25 grams) was mixed with a solution of 44 cc water and 4.5 cc concentrated hydrochloric acid. Hydrolysis was completed after a reaction at 1 hour at 60° C. Butanol was removed by distillation in a solution of aluminum chlorohydroxide and having an aluminum to chlorine ratio of 1.75 to 1 was prepared. This solution was not satisfactory for fiber formation.

EXAMPLE 6

Aluminum isopropoxide was prepared by refluxing 240 grams of isopropanol (four moles) under a nitrogen atmosphere then adding 27 grams (1 mole) of finely divided aluminum metal. The reaction proceeded with hydrogen evolution. The product was kept in a sealed flask for further testing.

EXAMPLE 7

A process described in Example 6 was repeated except that 296.5 grams of dried n-butanol was refluxed under a nitrogen atmosphere while 1 mole of aluminum metal was added. The n-butanol had been passed through a 3-angstrom molecular sieve prior to reaction. The product obtained was stored under a nitrogen atmosphere in a sealed flask.

EXAMPLE 8

Aluminum n-pentoxide was prepared by reacting 4 moles of n-amyl alcohol (353 grams) with 1 mole of aluminum as described in Examples 6 and 7.

EXAMPLE 9

Aluminum hexoxide was prepared by reacting 4 moles of n-hexanol (408.8 grams) with 1 mole of aluminum metal as described in Examples 6 and 7.

Alkoxides obtained from Examples 6, 7, 8, and 9 were divided into equal portions to compare the reaction of gaseous HCl with aqueous HCl. Specific procedures for these reactions are set forth in Examples 10 and 11.

EXAMPLE 10

The effect of concentrated HCl was determined by placing 182.8 grams of aluminum hexoxide and hexanol solvent containing 0.464 moles of alumina. This solution was heated to 85° C. and 19.36 cc of concentrated hydrochloric acid was added. Following acid addition, 45 cc of water were added. The temperature was maintained at reflux (100° C.) for 2.5 hours. A white solid product was obtained. The product was washed three times with hexane and dried at 60° C. in a vacuum oven.

EXAMPLE 11

The effect of gaseous HCl by adding 182.8 grams of aluminum hexoxide to 0.536 moles of aluminum and hexanol solvent at 92° C. Gaseous hydrochloric acid (9.98 grams) was added. Following acid addition, 60 cc of water was added to hydrolyze the product. All but a few grams of material was fluid. The fluid was extracted three times with hexane in a separatory funnel and the liquid dried at 60° C. in a vacuum oven.

Examples 12 through 17 were carried out as described in Examples 10 and 11 using aluminum n-pentoxide, aluminum n-butoxide and aluminum isopropoxide. The solid products were analyzed for aluminum and chlorine content. The results are set forth in Table 1 below.

TABLE 1

| Example | Al w/o | Cl w/o | Source |
|---|---|---|---|
| 10 | 24.8 | 16.8 | $Al(OC_6H_{11})_3$ + aq HCl |
| 11 | 27.3 | 19.9 | $Al(OC_6H_{11})_3 \xrightarrow{HCl\,(g)} \xrightarrow{H_2O}$ |
| 12 | 26.3 | 15.8 | $Al(OC_5H_{11})_3$ HCl(aq) |
| 13 | 26.4 | 16.6 | $Al(OC_5H_{11})_3 \xrightarrow{HCl\,(g)} \xrightarrow{H_2O}$ |
| 14 | 23.5 | 16.8 | $Al(OC_4H_9)_3 \xrightarrow{HCl\,(aq)}$ |
| 15 | 25.2 | 17.2 | $Al(OC_4H_9)_3 \xrightarrow{HCl\,(g)} \xrightarrow{H_2O}$ |
| 16 | 25.0 | 16.8 | $Al(o\text{-}i\text{-}C_3H_7)_3 \xrightarrow{HCl\,(aq)}$ |
| 17 | 21.2 | 16.2 | $Al(o\text{-}i\text{-}C_3H_7)_3 \xrightarrow{HCl} \xrightarrow{H_2O}$ |

Samples of the eight solid products obtained were dissolved in the water to make a 20 weight percent solid solution. A comparison of the solids showed that when the alkyl group of the aluminum alkoxide was larger than 5, different behavior was obtained as compared to alkyl groups less than 5. Less polymerized alumina having a lower viscosity results from hydrolysis of aluminum alkoxides where the alkyl groups averaged less than 5 carbon atoms and the hydrochloric acid is added to the aluminum alkoxide followed by water hydrolysis. The results are set forth in Table 2.

TABLE 2

| Example | | Relative Viscosity |
|---|---|---|
| 10 | Some solids, milky color | Solids present |
| 11 | Solids, milky color | Solids present |
| 12 | Clear solution | 1.18 |
| 13 | Clear solution | 1.00 |
| 14 | Clear solution | 1.24 |
| 15 | Clear solution | 1.03 |
| 16 | Clear solution | 1.37 |
| 17 | Cloudy - no solids | 1.05 |

While either gaseous hydrogen chloride or aqueous hydrochloric acid can be used, gaseous addition is preferred. However, either method of addition forms solutions suitable for fiber formation as shown in Examples 12 through 17.

While certain embodiments and details have been shown for the purpose of illustrating this invention, it will be apparent to those skilled in this art that various changes and modifications may be made herein without departing from the spirit or scope of the invention.

I claim:

1. A single phase process for producing aluminum oxychloride solution comprising
   (a) adding HCl to aluminum alkoxides where the alkoxide units contain from 1 to 5 carbon atoms to form chloride-containing alkoxides, wherein from about 0.2 to about 1.0 moles of HCl per mole of aluminum alkoxide is used;
   (b) hydrolyzing the reaction product of (a) to form alcohols and aluminum oxychlorides; then
   (c) removing alcohols and recovering aluminum oxychloride.

2. A method as described in claim 1 wherein (a) is carried out at a temperature of from about 20° C. to about 130° C.

3. A method as described in claim 2 wherein (b) is carried out at a temperature of from about 20° C. to about 120° C.

4. A method as described in claim 1 wherein aluminum alkoxide is obtained by dissolving aluminum metal in an alcohol containing from 1 to 5 carbon atoms.

5. A method as described in claim 4 wherein the alcohol contains from 2 to 4 carbon atoms.

6. A method as described in claim 5 wherein the mole ratio of hydrochloric acid to aluminum alkoxide is from about 0.4 to about 0.6 moles hydrochloric acid per mole of alumina, and the hydrochloric acid is gaseous.

7. A method as described in claim 6 wherein the alcohol is recovered by distillation.

8. A method as described in claim 6 wherein the reactions of (a) and (b) are carried out at a pressure of from about atmospheric to about 100 psig.

9. A method as described in claim 1 wherein the aluminum alkoxide is obtained from the growth product of Ziegler aluminum chemistry.

10. A method as described in claim 9 where the alcohols contain from 2 to 4 carbon atoms.

11. A method as described in claim 9 wherein the mole ratio of hydrochloric acid to aluminum alkoxide is from about 0.4 to about 0.6 moles hydrochloric acid per mole of alumina and the hydrochloric acid is gaseous.

12. A method as described in claim 9 wherein the alcohol is recovered by distillation.

* * * * *